(12) United States Patent
Sui et al.

(10) Patent No.: US 9,660,849 B2
(45) Date of Patent: May 23, 2017

(54) DEMODULATING FREQUENCY SHIFT KEYING MODULATED INPUT SIGNAL

(71) Applicant: Freescale Semiconductor, Inc., Austin, TX (US)

(72) Inventors: Zhiling Sui, Suzhou (CN); Zhijun Chen, Suzhou (CN); Zhihong Cheng, Suzhou (CN); Jiangtao Pan, Suzhou (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/867,014

(22) Filed: Sep. 28, 2015

(65) Prior Publication Data
US 2016/0285658 A1   Sep. 29, 2016

(30) Foreign Application Priority Data

Mar. 27, 2015  (CN) .......................... 2015 1 0232649

(51) Int. Cl.
| | |
|---|---|
| *H04B 7/02* | (2017.01) |
| *H03F 3/45* | (2006.01) |
| *H04L 27/156* | (2006.01) |
| *H04W 56/00* | (2009.01) |
| *H04L 7/00* | (2006.01) |
| *H04L 27/16* | (2006.01) |

(52) U.S. Cl.
CPC ........ *H04L 27/1563* (2013.01); *H04L 7/0087* (2013.01); *H04L 27/16* (2013.01); *H04W 56/0045* (2013.01)

(58) Field of Classification Search
CPC ..... H04L 27/0014; H04L 27/14; H04L 27/12; H04L 27/142; H04L 27/16; H04L 27/106; H04L 27/22; H04L 7/0087
USPC .......................................... 375/267; 330/254
See application file for complete search history.

(56) References Cited

U.S. PATENT DOCUMENTS

| | | | | |
|---|---|---|---|---|
| 5,287,516 | A * | 2/1994 | Schaub ................. | H04L 27/148 329/300 |
| 5,335,107 | A * | 8/1994 | Georges ............... | H04B 10/504 372/26 |
| 5,414,736 | A * | 5/1995 | Hasegawa ............. | H04L 27/152 329/302 |
| 5,550,505 | A | 8/1996 | Gaus, Jr. | |
| 5,682,426 | A * | 10/1997 | Miliani ................ | H04N 7/171 348/E7.056 |
| 6,985,035 | B1 * | 1/2006 | Khorramabadi .... | H01F 17/0006 330/149 |

(Continued)

*Primary Examiner* — Daniel Washburn
*Assistant Examiner* — Sarah Hassan
(74) *Attorney, Agent, or Firm* — Charles E. Bergere

(57) ABSTRACT

A method of demodulating an FSK modulated input signal whose frequency varies between first and second frequencies. The input signal is delayed by a plurality of cycles, providing a second signal. A succession of phase reference signals having respective incrementally greater phase delays relative to the input signal are provided. Samples of the phase reference signals are taken at intervals determined by the second signal. A transition between the first and second frequencies is detected when the relative values of the samples of the phase reference signals remain constant during a plurality of intervals after varying. A high speed clock is not required to perform the demodulation.

8 Claims, 4 Drawing Sheets

(56) References Cited

U.S. PATENT DOCUMENTS

| | | | |
|---|---|---|---|
| 7,042,923 B1* | 5/2006 | McCrank | H04B 1/7136 370/437 |
| 7,079,600 B2* | 7/2006 | Byun | H04L 27/1563 329/300 |
| 2001/0007151 A1* | 7/2001 | Vorenkamp | H01F 17/0006 725/151 |
| 2002/0047942 A1* | 4/2002 | Vorenkamp | H04N 5/455 348/731 |
| 2003/0020544 A1* | 1/2003 | Behzad | H01F 17/0006 330/254 |
| 2004/0037251 A1* | 2/2004 | Shneyour | H04L 1/08 370/336 |
| 2005/0021108 A1* | 1/2005 | Klosterman | A61N 1/3605 607/48 |
| 2007/0147544 A1 | 6/2007 | Akahori | |
| 2011/0129034 A1 | 6/2011 | Akahori | |

* cited by examiner

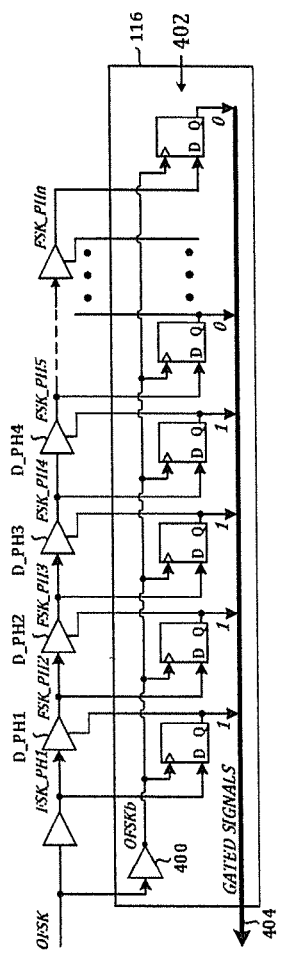
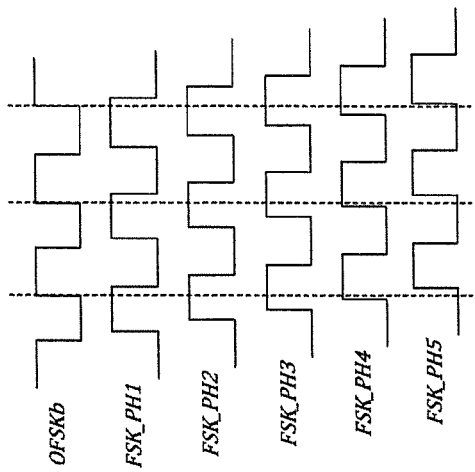
FIG. 4
FIG. 5

DEMODULATING FREQUENCY SHIFT KEYING MODULATED INPUT SIGNAL

BACKGROUND OF THE INVENTION

The present invention is related generally to wireless charging systems and, more particularly, to demodulating a frequency shift keying modulated input signal.

Frequency shift keying (FSK) is a technique for communicating data by discrete frequency changes of a signal. The simplest FSK scheme is binary FSK, in which the frequency varies between two frequencies to communicate binary data, but more than two frequencies can be used for the FSK modulation.

FSK is used in a great variety of applications such as for contactless key cards for controlling door locks, smart ID tags and smart labels that can be attached on books and other products offered for self-service sale, implanted devices like cochlear implants and other hearing aids, implanted programmable pacemakers, and control signals for wireless charging systems.

The power consumed by demodulation and the cost of the demodulator of the FSK signal are often major design factors, especially if the receiver and FSK demodulator are in a battery powered device.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

FIG. 4 is a schematic block diagram of a module for providing a gating signal in the demodulator of FIG. 1; and FIG. 5 is a graph against time of signals appearing in operation of the module of FIG. 4.

DETAILED DESCRIPTION

Figure 1:
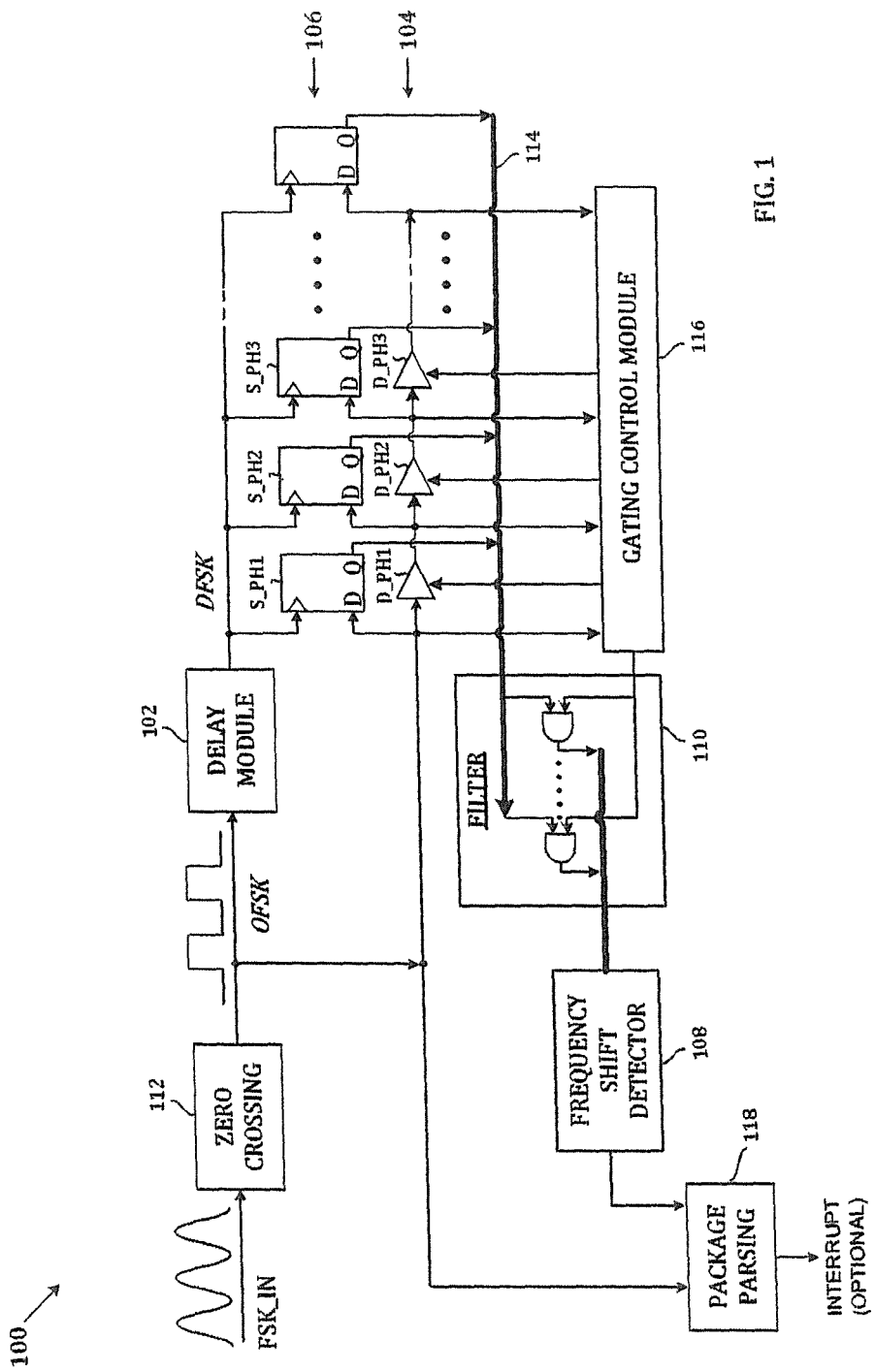
FIG. 1 is a schematic block diagram of a receiver in wireless communication apparatus including a demodulator for demodulating a FSK modulated input signal in accordance with an embodiment of the invention.
Figure 2:
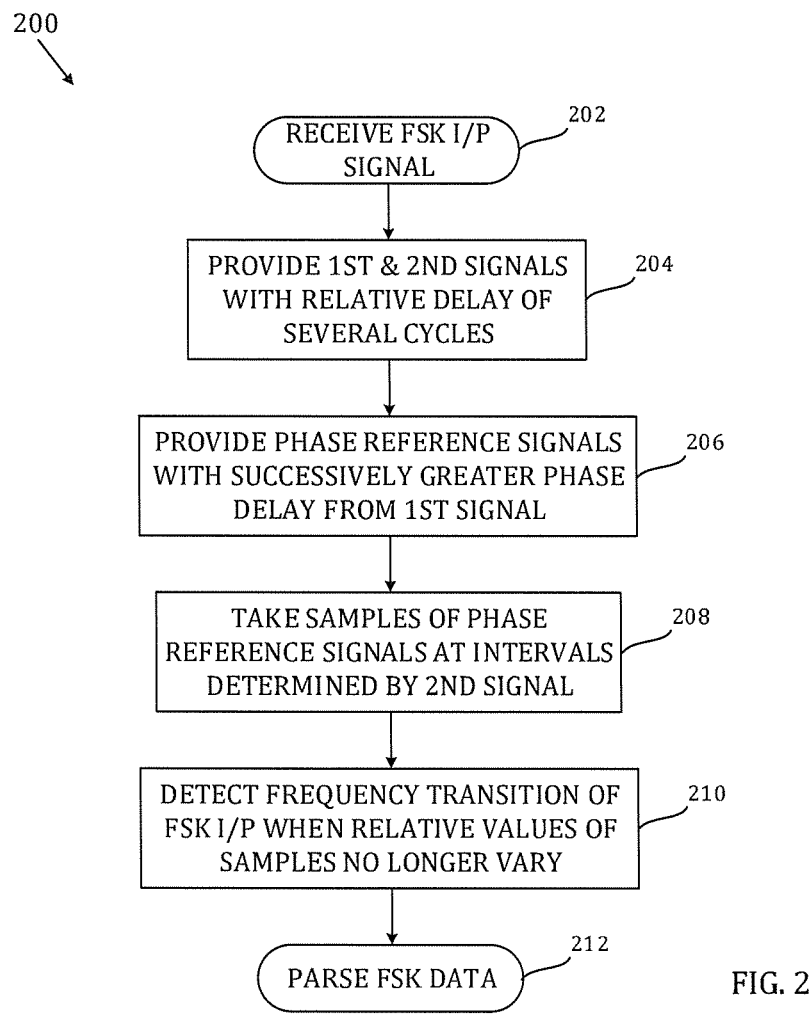
FIG. 2 is a flow chart of a method of demodulating a FSK modulated input signal in accordance with an embodiment of the invention.

FIGS. 1 and 2 illustrate respectively a demodulator 100 in a wireless receiver, and a method 200, for demodulating a frequency shift keying (FSK) modulated input signal FSK_IN whose frequency varies between at least a first frequency and a second frequency $F_{OP}$ and $F_{MOD}$. In the method, the input signal FSK_IN is received at step 202. First and second signals OFSK and DFSK having a relative delay $T_{DELAY}$ greater than a plurality of cycles of the lesser of the first and second frequencies $F_{OP}$ and $F_{MOD}$ of the input signal FSK_IN are provided at step 204. A succession of phase reference signals FSK_PH0 to FSK_PH3 having respective incrementally greater phase delays 0 and $\Delta T1$ to $\Delta T3$ relative to the first signal OFSK are provided at step 206. Samples of the phase reference signals FSK_PH0 to FSK_PH3 are provided at intervals determined by the second signal DFSK at step 208. A transition between the first and second frequencies $F_{OP}$ and $F_{MOD}$ is detected at step 210 when the relative values of the samples of the signals FSK_PH0 to FSK_PH3 vary during a first plurality of intervals and then remain constant during a second plurality of intervals. The detected FSK data may be parsed at step 212 for exploitation in the receiver.

The second signal DFSK is used to time the sampling of the phase reference signals FSK_PH0 to FSK_PH3. In an example of an implementation of the method 200, an FSK signal at 100 kHz to 200 kHz frequency can be demodulated without the use of a high frequency clock running at 20 MHz or more, so the cost and the power consumption of the high frequency clock can be saved. The response time of the method 200 can be faster than a method using group period demodulation.

Referring now to FIG. 1, the demodulator 100 may include a delay module 102 for providing the relative delay $T_{DELAY}$ between the first and second signals OFSK and DFSK, a phase shift module 104 for providing the succession of phase reference signals FSK_PH0 to FSK_PH3, a sampling module 106 for providing samples of the phase reference signals, and a detector 108 for detecting the transition between the first and second frequencies.

The greatest phase delay ($\Delta T1$ to $\Delta T3$) relative to the first signal OFSK may be at least one half cycle ($T_{OP}/2$) of the first signal OFSK. The demodulator 100 may have a filter 110 that excludes from the samples phase reference signals FSK_PH0 to FSK_PH3 whose delay ($\Delta T1$ to $\Delta T3$) is greater than one half cycle ($T_{OP}/2$) of the first signal.

The delay $T_{DELAY}$ between the first and second signals OFSK and DFSK may include a number of cycles N of the signals OFSK and DFSK sufficient for a plurality of the phase reference signals FSK_PH0 to FSK_PH3 to invert their phase relative to the second signal DFSK.

The phase shift module 104 may comprise a plurality of delay phase elements such as D_PH1 to D_PH3 connected in series whose respective outputs have incrementally greater phase $\Delta T1$ to $\Delta T3$ relative to the first signal OFSK, and a plurality of sampling elements such as S_PH1 to S_PH3 for sampling respective outputs of the delay phase elements D_PH1 to D_PH3 at the intervals determined by the second signal DFSK.

The delay module 102 delays the second signal DFSK relative to the first signal OFSK by a delay $T_{DELAY}$, which is a defined lapse of time.

In more detail, the FSK modulated input signal FSK_IN is a sine wave signal in this example and is converted to a square wave by a zero crossing detector 112 to provide the first signal OFSK. The delay module 102 delays the first signal OFSK by the time delay $T_{DELAY}$ to provide the second signal DFSK.

The first signal OFSK is supplied to the series of delay phase elements such as D_PH1 to D_PH3 in the phase shift module 104, which may be buffer amplifiers enabled at timing controlled by a control module 116 for example, each introducing an equal incremental phase delay relative to the preceding element, to produce the phase reference signals FSK_PH0 to FSK_PH3. In one embodiment, the sampling elements such as S_PH0 to S_PH3 are D-flip-flops having data inputs connected to receive the phase reference signals FSK_PH0 (the first signal OFSK) to FSK_PH3 respectively, and have clock inputs connected to the output of the delay module 102 so that the D-flip-flops S_PH0 to S_PH3 sample the phase reference signals FSK_PH0 to FSK_PH3 on the rising edges of the second signal DFSK. The samples of the signals are encoded as sampled data on a multi-bit bus 114 and provided to the filter 110, which gates out redundant samples.

Figure 3:
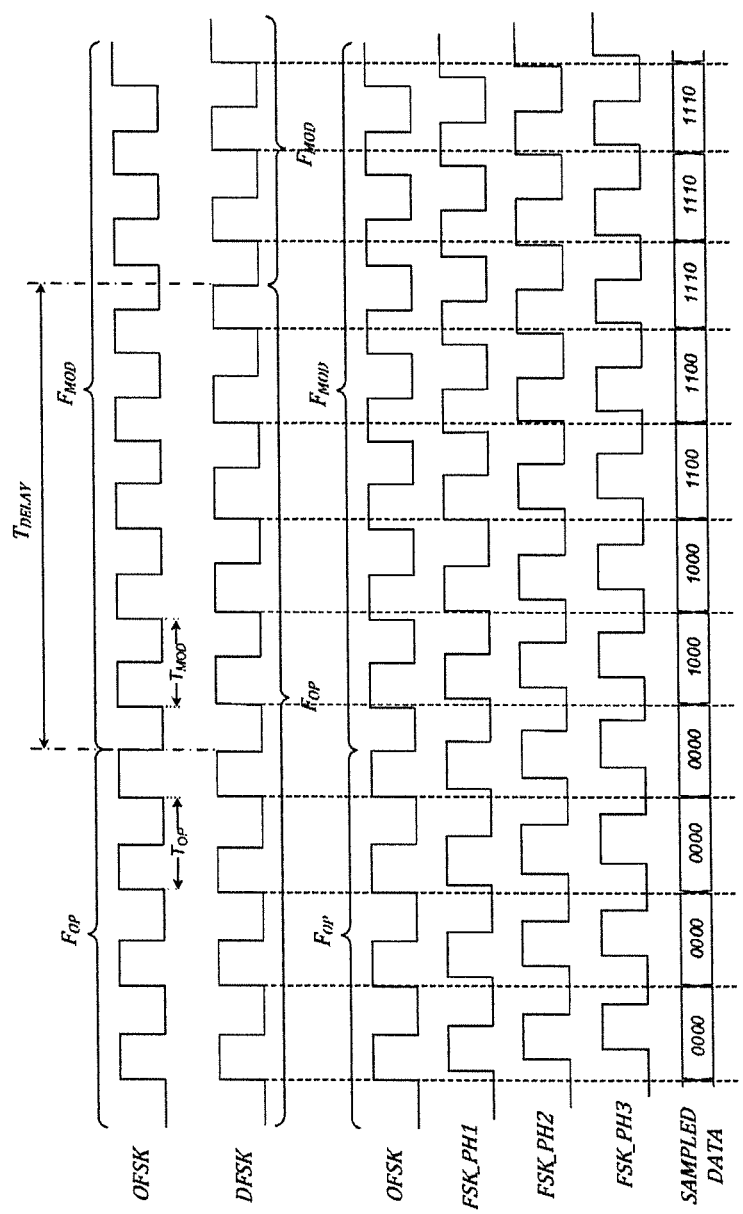
FIG. 3 is a graph against time of signals appearing in operation of the demodulator of FIG. 1 and in the method of FIG. 2.

Referring to FIG. 3, in operation, the values of the sampled data on the bus 114 remain constant while the phase reference signals FSK_PH0 to FSK_PH3 have the same first frequency $F_{OP}$ and the same phase. When the frequency of the phase reference signals FSK_PH0 to FSK_PH3 changes to the second frequency $F_{MOD}$, the relative values of the sampled data start to change in successive cycles. The relative values of the sampled data continue to change as the successive phase reference signals FSK_PH0 to FSK_PH3 become asserted in phase with the clock formed by the rising edge of the second signal DFSK. However, when the frequency of the second signal DFSK also changes to the second frequency $F_{MOD}$, the relative values of the sampled data stop changing in successive cycles.

This operation is quantified by the following equations:

$$T_{DELAY} = N*T_{OP} + \Delta T_{OP}$$

$$T_{DELAY} = N*T_{MOD} + \Delta T_{MOD}$$

$$\Delta T = \Delta T_{OP} - \Delta T_{MOD} = N*(T_{MOD} - T_{OP})$$

where $T_{DELAY}$ is the delay of the second signal DFSK relative to the first signal OFSK, N is the number of complete cycles of the second signal DFSK or the first signal OFSK in the delay $T_{DELAY}$, $T_{OP}$ is the period of the first frequency $F_{OP}$, $T_{MOD}$ is the period of the second frequency $F_{MOD}$, and $\Delta T_{OP}$ and $\Delta T_{MOD}$ are the residual phase delays, additional to the number N of cycles, between an edge of the second signal DFSK and the corresponding edge of the first signal OFSK at the first and second frequencies $F_{OP}$ and $F_{MOD}$ respectively.

In a simple example, $T_{DELAY}$ is 50.2 ns, $T_{OP}$ is 10 ns, $T_{MOD}$ is 9.4 ns and N is 5 complete cycles. The difference in period ($T_{OP}-T_{MOD}$) between the first frequency $F_{OP}$ and the second frequency $F_{MOD}$ is 0.6 ns. However, the residual phase delays $\Delta T_{OP}$ and $\Delta T_{MOD}$ are 0.2 ns and 3.2 ns (50.2 mod 10 and 50.2 mod 9.4 respectively). The difference ($\Delta T_{OP}-\Delta T_{MOD}$) between $\Delta T_{OP}$ and $\Delta T_{MOD}$ is −3 ns, which is amplified by a factor of 5 compared to the difference in period ($T_{OP}-T_{MOD}$) and is easier to detect. It will be appreciated that the values of the time delay $T_{DELAY}$ between the first and second signals OFSK and DFSK can be chosen to suit the particular embodiment, and can even be programmable to adjust over a wide range of frequency.

The aggregate delay of the series of delay phase elements such as D_PH1 to D_PH3 in the phase shift module 104 is at least a half cycle max ($T_{OP}$, $T_{MOD}$)/2 of the bigger of the periods $T_{OP}$ and $T_{MOD}$ of the first and second frequencies $F_{OP}$ and $F_{MOD}$, so as to detect the biggest residual phase delays $\Delta T_{OP}$ and $\Delta T_{MOD}$. If the aggregate delay of the series of delay phase elements is greater than a half cycle max ($T_{OP}$, $T_{MOD}$)/2 of the bigger of the periods $T_{OP}$ and $T_{MOD}$, the bits of the sampled data on the multi-bit bus 114 will be redundant. The redundant bits are filtered out by the filter 110, controlled by a gating control module 116.

The frequency shift detector 108 detects a period when the sampled data changes continuously, and the sampled data may then stop changing in successive cycles, without need for a high speed system clock. The resulting data can be parsed in a package parsing module 118, to communicate the message of successive bits from the detector 108 for exploitation in the receiver.

FIGS. 4 and 5 illustrate an example of a gating control module 116 and its operation. The gating control module 116 receives the first signal OFSK, and the phase reference signals, in this case FSK_PH1 to FSK_PH5 and FSK_PHn. The first signal OFSK is input to an inverter 400 whose output is OFSKb. The phase reference signals FSK_PH1 to FSK_PHn are input to the data inputs of respective D-flip-flops 402 having clock inputs connected to the output of the inverter 400 to sample the outputs of the D-flip-flops 402 on the rising edges of the inverted signal OFSKb (the falling edges of the first signal OFSK). Only those of the phase reference signals FSK_PH1 to FSK_PHn that are asserted while the inverted signal OFSKb is asserted will appear in the gated signal output of the gating control module 116 on a gated signal multi-bit bus 404. In the filter 110, logic elements such as AND gates mask the redundant data in the absence of conjunction of data from the multi-bit bus 114 and the gated signals from the multi-bit bus 404. In the example illustrated in FIG. 5, the phase reference signals FSK_PH1 to FSK_PH4 are asserted at the positive edges (assertion) of the inverted signal OFSKb and the corresponding sampled data signals from the outputs of the D-flip-flops 402 pass on the bus 404 to the frequency shift detector 108. However, the phase reference signals FSK_PH5 to FSK_PHn are de-asserted at the positive edges of the inverted signal OFSKb and the sampled data signals from the corresponding outputs of the D-flip-flops 402 are gated out.

The invention may be implemented at least partially in a non-transitory machine-readable medium containing a computer program for running on a computer system, the program at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be stored internally on computer readable storage medium or transmitted to the computer system via a computer readable transmission medium. All or some of the computer program may be provided on non-transitory computer readable media permanently, removably or remotely coupled to an information processing system.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice-versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of demodulating a frequency shift keying (FSK) modulated input signal whose frequency varies between a first frequency and a second frequency, the method comprising:
   providing a first signal based on the FSK modulated input signal, and a second signal having a delay relative to the first signal greater than a plurality of cycles of the lesser of the first and second frequencies;
   providing a succession of phase reference signals having respective incrementally greater phase delays relative to the first signal;
   providing samples of the phase reference signals at intervals determined by the second signal; and
   detecting a transition between the first and second frequencies when the relative values of the samples vary during a first plurality of intervals and then remain constant during a second plurality of intervals.

2. The method of claim 1, wherein the greatest phase delay relative to the first signal is at least one half cycle of the first signal.

3. The method of claim 2, wherein phase reference signals whose delay is greater than one half cycle of the first signal are excluded from the samples.

4. The method of claim 1, wherein the delay between the first and second signals includes a number of cycles of the signals such that the phases of a plurality of the phase reference signals invert relative to the second signal.

5. A method of demodulating a frequency shift keying (FSK) modulated first signal whose frequency varies between at least a first frequency and a second frequency, the method comprising:
   providing a second signal having a delay relative to the first signal greater than a plurality of cycles of the lesser of the first and second frequencies;
   providing a succession of phase reference signals having respective incrementally greater phase delays relative to the first signal;
   providing samples of the phase reference signals at intervals determined by the second signal; and
   detecting a transition between the first and second frequencies when the relative values of the samples vary during a first plurality of intervals and then remain constant during a second plurality of intervals.

6. The method of claim 5, wherein the greatest phase delay relative to the first signal is greater than one half cycle of the first signal.

7. The method of claim 5, wherein phase reference signals whose delay is greater than one half cycle of the first signal are excluded from the samples.

8. The method of claim 5, wherein the delay between the first and second signals includes a number of cycles of the signals such that the phases of a plurality of the phase reference signals invert relative to the second signal.

* * * * *